United States Patent [19]

Grantham

[11] 4,218,301
[45] Aug. 19, 1980

[54] APPARATUS FOR PRODUCING HBR UTILIZING A CONSUMABLE BROMINE ELECTRODE

[75] Inventor: Daniel H. Grantham, Glastonbury, Conn.

[73] Assignee: United Technologies Corporation, Hartford, Conn.

[21] Appl. No.: 56,565

[22] Filed: Jul. 11, 1979

Related U.S. Application Data

[62] Division of Ser. No. 956,761, Nov. 1, 1978.

[51] Int. Cl.² ............................................ C25B 1/22
[52] U.S. Cl. ................................................. 204/251
[58] Field of Search .............................. 204/103, 251

[56] References Cited

U.S. PATENT DOCUMENTS 4,053,376  10/1977  Carlin .................................. 204/113

FOREIGN PATENT DOCUMENTS 254490  11/1967  U.S.S.R. ................................ 204/103

Primary Examiner—R. L. Andrews
Attorney, Agent, or Firm—Harry J. Gwinnell

[57] ABSTRACT

Method and apparatus are disclosed for producing oxygen and hydrogen bromide in an electrolytic cell utilizing, as the cathode, a consumable bromine electrode comprising bromide ions dissolved in a pool of liquid bromine surrounding a metal electrode. The electrolytic cell also contains a water solution of an electrolyte on both sides of a hydrogen ion permeable membrane forming a two-compartment electrolytic cell. In operation of the preferred process, hydrogen bromide gas is given off in the cathode compartment and oxygen gas is given off in the anode compartment.

11 Claims, 2 Drawing Figures

APPARATUS FOR PRODUCING HBR UTILIZING A CONSUMABLE BROMINE ELECTRODE

CROSS REFERENCES TO RELATED APPLICATIONS

This is a division of application Ser. No. 956,761 filed on Nov. 1, 1978.

Reference is made to an application filed by the same inventor, having the same assignee, Ser. No. 956,760 of even filing date herewith entitled "Hydrogen Gas Generation Utilizing A Bromide Electrolyte And Radiant Energy" which demonstrates a method of evolving hydrogen gas utilizing hydrogen bromide which can be produced by practice of the instant invention.

BACKGROUND OF THE INVENTION

1. Field of the Invention

The field of art to which this invention pertains is electrolytic processes and, particularly, those for producing hydrogen bromide and electrolytic cells useful for performing such processes.

2. Description of the Prior Art

The recognition of the potential for using liquid bromine as an electrode in the prior art has received little attention because of the electrical insulating properties of liquid bromine, i.e., it has not been useful for transmitting electric current in the electrolytic cell environment. And while hydrogen bromide has been recognized as having great potential in a fuel cell environment, it has received little attention because of the difficulties of producing it, especially in an electrolytic cell. Note an article entitled "Performance Of Hydrogen-Bromine Fuel Cells" by Werner Glass et al, *Advances in Chemistry Series*, Vol. 47, 1964, ACS Applied Publications. One approach to the use of hydrogen bromide in an electrolytic and ultimately fuel cell environment is disclosed by Meyerand et al, U.S. Pat. No. 4,069,120. In this patent, bromine and water are reacted in gaseous form to produce hydrogen bromide and oxygen. However, as noted, such reactions take place in the gaseous phase.

Accordingly, what has been lacking in the prior art is a simple electrolytic method of producing hydrogen bromide in a simple, basic apparatus.

BRIEF SUMMARY OF THE INVENTION

In accordance with the present invention, a metal electrode surrounded by a pool of liquid bromine containing dissolved bromide ions is utilized in an electrolytic method to produce hydrogen bromide.

Particular embodiments of the invention are demonstrated by several versions of apparatus useful to perform such processes.

The foregoing and other objects, features and advantages of the present invention will become more apparent in light of the following detailed description of preferred embodiments thereof as discussed and illustrated in the accompanying drawings.

DESCRIPTION OF PREFERRED EMBODIMENTS

Figure 1:
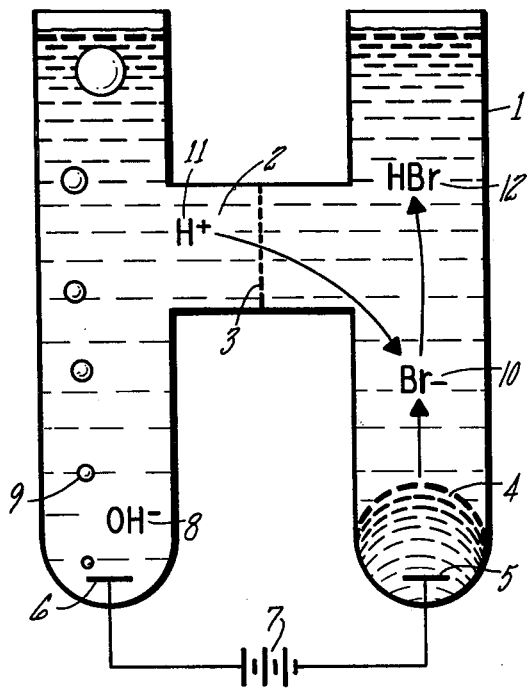
FIG. 1 is a drawing of apparatus useful for performing the invention utilizing a battery as a power source.

As discussed above, the invention provides an efficient, simple method and apparatus for producing hydrogen bromide and oxygen in an electrolytic cell. The hydrogen bromide and oxygen evolved from such cell can be used ultimately to produce hydrogen and oxygen for use in a fuel cell.

The basic reactions involved in the method and apparatus of the invention may be expressed as follows: at the cathode, $$Br_2 + 2e^- \rightarrow 2Br^-$$

$$Br^- + H^+ \rightarrow HBr(g)$$

at the anode, $$H_2O \rightarrow H^{3O} + OH^-$$

$$4OH^- \rightarrow O_2(g) + 2H_2O + 4e^-$$

Essential to the invention is the use of a pool of bromine surrounding a metal electrode such as platinum or titanium in the electrolytic cell, providing a steady supply of bromide ions to combine with the hydrogen ions evolved in the anodic portion of the cell. Electron conductivity from the electrode through the bromide is made possible by the bromide ions dissolved in the liquid bromine surrounding the electrode. It has been discovered that by dissolving the bromide ions in the liquid bromine, the bromine becomes conductive allowing current to flow through the liquid bromine to an electrolyte solution contacting the liquid bromine. Absent the dissolved bromide compounds, there is no current flow detectable through the liquid bromine and in fact the liquid bromine effectively insulates the electrode in that portion of the cell. The dissolved bromide ions in the liquid bromine serve to maintain charge neutrality in the liquid bromine as electrons flow from the electrode and combine with the liquid bromine. By such process additional bromide ions are formed and flow out of the liquid bromine and into the electrolyte solution contacting the liquid bromine. The solvent for the electrolyte solution is water and the bromide ions evolving from the liquid bromine dissolve in the water forming a saturated solution of bromide, which saturation is maintained throughout the period of operation of the cell. Without the bromide ions present in the liquid bromine, a potential drop would not take place at the interface of the electrode and the liquid bromine to convert bromine to the bromide ion source necessary for effective use of the cell. The current flow takes place from the electrode on the water side of the cell to the bromine liquid containing the electrode. While any metal electrode non-reactive with the bromine can be used, platinum and titanium electrodes are preferred, with platinum electrodes the most preferred.

The amount of bromide ions necessary to conduct charge through the bromine liquid is easily determinable by one skilled in this art. The bromide compound is simply added to the bromine until current flow is detected at the anticipated cell potentials to be employed. The rate of current flow will depend on the amount of dissolved bromide, but care must be exercised to prevent overvoltage problems which will adversely affect the efficiency of the system.

The hydrogen bromide and oxygen gases emitted by such process and apparatus complete a water splitting cycle which begins with production of hydrogen and bromine by electrolysis of hydrogen bromide solutions, e.g., as in copending application Ser. No. 956,760. The hydrogen bromide produced in the reaction of the instant application can be recycled to produce hydrogen and bromine further providing the option of transporting the hydrogen from the production site for use in oxygen-hydrogen fuel cells or other energy producers using hydrogen fuel. As can clearly be seen, by combining the processes of the instant application and the aforementioned copending application, a closed cycle system can be established by recycling the bromine produced in the aforementioned copending application and adding water as a source of hydrogen ions to constantly recover chemical energy using radiant energy. The cyclic nature of such a process can further be demonstrated by the following equations:

$2HBr \rightarrow H_2 + Br_2$ (aforementioned copending application)

$2H_2O + 2Br_2 \rightarrow 4HBr + O_2$ (instant application)

$2H_2O \rightarrow 2H_2 + O_2$ (overall reaction)

Also, while the cells may be powered by an external power source such as a battery connecting the two metal electrodes, the external power source may be eliminated and the metal anode replaced by a suitable semiconducting electrode utilizing radiant energy, e.g., solar, to power the cell. Or a combination of radiant energy and external power source may be employed to power the cell. In any arrangement, the power supplied by either the semiconductor, external power source, or semiconductor and external power source must provide sufficient energy to evolve the $O_2$ and HBr gases. This energy will depend on the standard cell potential of the particular electrolyte being employed and its concentration. Also, if radiant energy is chosen to at least partially power the system, the particular radiant energy source and the semiconductor material must be matched, i.e., the wavelength of the radiant energy source must be shorter than the band gap radiation characteristic of the semiconductor used. For example, for a silicon semiconductor any light source with wavelengths less than 11,000Å could be used to provide power to the system. And while solar energy is the preferred source of radiation when a semiconducting electrode is being used, other radiant energy sources can be used such as laser radiation or light emitting solid state diodes. For example, for an 18% solution of $H_2SO_4$ electrolyte, 0.17 volt would be the minimum voltage required to run the cell (note the Example). Therefore, either the battery or other external power source, the semiconductor-radiant energy source, or the combination of the two would have to meet this threshold voltage in order to operate the system effectively. And while voltages higher than this threshold voltage may be used, e.g., to increase the rate of HBr and $O_2$ production, the efficiency of the system must be considered based on the additional voltage used.

As demonstrated by the accompanying figures, the cells of the present invention contain two chambers: one containing the bromine electrolyte and water and the other electrolyte and water, separated by a hydrogen ion permeable membrane. On the anode side of the cell, the hydroxyl ions present by virtue of the water in the cell give up electrons ultimately forming oxygen gas and hydrogen ions. The oxygen is evolved as a gas on the anode side of the cell while the hydrogen ions transport through the hydrogen ion permeable membrane, thus completing the circuit in the cell. Examples of hydrogen ion permeable membranes which can be used are Nafion ® (E. I. Dupont de Nemours and Co.), polyvinyl chloride, polytetrafluoroethylene and thin quartz. When the hydrogen ions combine with the bromide ions present in the cathodic portion of the cell the hydrogen bromide gas is evolved and will be dissolved in the water until the water is saturated, at which time it will evolve as a gas and can be collected. As mentioned above, the hydrogen bromide thus produced can be utilized in the process and apparatus of copending application Ser. No. 956,760 to provide hydrogen for running a fuel cell. Thus, the combination of the two inventions are capable of providing a closed cycle system for running a fuel cell.

The source of the bromide ions can be any well known, dissolvable bromide salt, such as KBr, LiBr, $NH_4Br$, CsBr, $SrBr_2$, NaBr, with tetra-alkyl ammonium bromides such as tetrapropyl ammonium bromide being preferred. Salt mixtures can also be used.

The electrolyte in the anode chamber of the electrolytic cell can be any electrolyte which will not interfere with the $O_2$ or HBr generation, e.g., sulfuric or phosphoric acids, in a preferred concentration of 10 molar. The electrolyte in the cathode chamber can be the same as in the anode chamber or a bromide electrolyte which will not interfere with the HBr generation, e.g., aforementioned bromide salts present in the liquid bromine also in a preferred concentration of 1 molar. While water is the preferred solvent for the cell, the system is readily adaptable to other solvents. For example, alcohols or amines may be used as solvents for the system. If alcohol or amine solvents are employed it is preferred to add at least small amounts of water to the system.

The Nernst equation which governs the cell potential relationship required for electrolysis in this process can be described as follows:

$E = E° + 0.059 \log P_{O_2} + 0.059 \log C_{Br^-} + 0.059 \log C_{H^+}$ wherein E° = standard cell potential for cell components (e.g., for this reaction 0.17 volt),
$P_{O_2}$ = partial pressure of oxygen produced in the cell,
$C_{H^+}$ = molar concentration of hydrogen ion in the cell,
E = the threshold voltage or cell potential at which current begins to flow in the cell and significant amounts of $O_2$ and HBr begin to evolve.

The preferred parameters for efficient operation of the cell of the present invention are:

$P_{O_2} > 0.05$ psi $C_{Br^-} > 0.1\%$ $C_{H^+} < 48\%$

A cell with such parameters can be efficiently run at temperatures between about 0° and 100° C. Percents as recited throughout the disclosure are percents by weight.

FIG. 1 discloses a preferred embodiment of the method and apparatus. In this figure electrolytic cell 1 contains a water solution of a sulfuric acid electrolyte 2, and a Nafion membrane 3 into which has been placed a consumable bromine electrode comprising a pool of liquid bromine 4 surrounding a platinum electrode 5. Platinum electrode 6 and battery source 7 complete the electric circuit. In operation, the electron flow is from platinum electrode 6 through battery source 7 to platinum electrode 5 transporting electrons from the dissolved hydroxyl ions 8 to the bromine liquid 4. This causes the evolution of oxygen gas 9 and bromide ions 10, and the flow of hydrogen ions 11 through Nafion membrane 3 to unite with the bromide ions 10 results in the evolution of hydrogen bromide gas 12 which dissolves in the solution up to saturation point before evolving as a gas.

Figure 2:
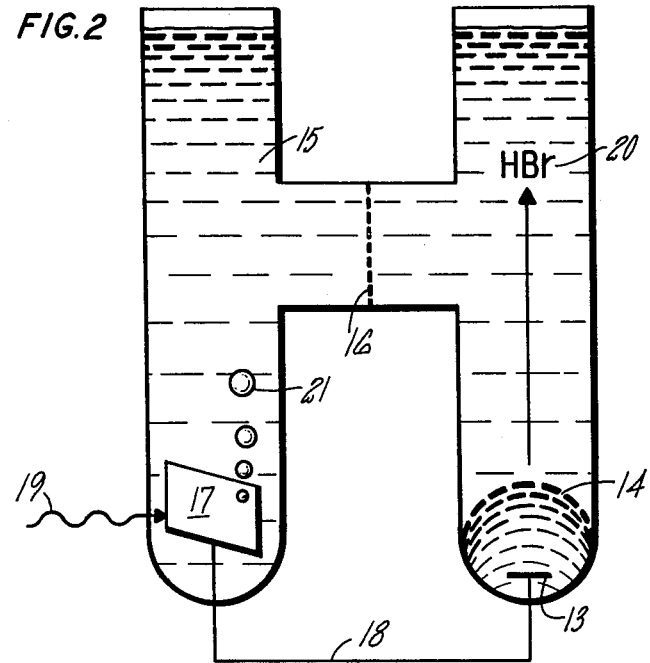
FIG. 2 is a drawing of apparatus similar to that shown by FIG. 1 utilizing radiant energy as the power source.

In FIG. 2, an alternative apparatus and method are shown where on the cathode side of the cell the platinum electrode 13 surrounded by bromine liquid 14 and sulfuric acid electrolyte solution 15 are separated from the anode side of the cell by Nafion membrane 16. But on the anode side of the cell a semiconductor electrode such as gallium arsenide 17 is utilized as the power source connected by conductor 18 to the platinum electrode 13. In the operation of such cell, a source of visible light such as sunlight 19 impinges on the semiconductor electrode 17 causing current flow to platinum electrode 13. The remainder of the method cycle is the same, with the hydrogen bromide 20 being evolved on the cathode side of the cell and the oxygen gas 21 being evolved on the anode side of the cell with appropriate ion transport through Nafion membrane 16. The semiconductor may be any suitable semiconductor depending on the wavelength of light impinging. For example, a silicon semiconductor would be useful with light wavelengths up to 11,000 Å while a $TiO_2$ semiconductor would be useful with wavelengths up to about 4,000 Å, and a GaAs semiconductor up to 8,900 Å.

A third version of apparatus useful for performing the method of the invention uses a combination of the two apparatuses of FIGS. 1 and 2, i.e., a combination of semiconductor and battery to power the cell.

EXAMPLE

In the apparatus of FIG. 1 utilizing two platinum electrodes and a Nafion membrane, an 18% by weight solution of $H_2SO_4$ in water was used as the electrolyte in both compartments. A 4 molar solution of tetrapropyl ammonium bromide in liquid bromine was added to the cathode compartment completely covering the platinum electrode (about 14 gm equaling about 5 cc). Upon application of a voltage of 0.17 volt across the platinum electrode, oxygen gas began bubbling at the anode and HBr was produced at the cathode.

Although this invention has been shown and described with respect to a preferred embodiment thereof, it should be understood by those skilled in the art that various changes and omissions in the form and detail thereof may be made therein without departing from the sprit and scope of the invention.

Having thus described a typical embodiment of my invention, that which I claim as new and desire to secure by Letters Patent of the United States is:

1. An electrolytic cell for the production of oxygen and hydrogen bromide comprising an anode containing chamber and a cathode containing chamber separated by a hydrogen ion permeable membrane wherein the cathode is a metal electrode completely surrounded by liquid bromine containing dissolved therein bromide ions sufficient to conduct current through the liquid bromine.

2. The electrolytic cell of claim 1 wherein both anode and cathode are metal electrodes.

3. The electrolytic cell of claim 2 wherein at least one electrode is platinum.

4. The electrolytic cell of claim 2 wherein at least one electrode is titanium.

5. The electrolytic cell of claim 1 wherein the anode is a semiconducting electrode.

6. The electrolytic cell of claim 5 wherein the semiconducting electrode is selected from the group consisting of gallium arsenide, silicon and titanium dioxide.

7. The electrolytic cell of claim 1 which additionally contains, in the anode and cathode containing chambers, a water solution of electrolyte.

8. The electrolytic cell of claim 7, wherein the electrolyte in the anode containing chamber is sulfuric or phosphoric acid and the electrolyte in the cathode containing chamber is a bromide compound.

9. The electrolytic cell of claim 8 wherein the bromide compound is selected from the group consisting of tetrapropyl ammonium bromide, potassium bromide, sodium bromide, ammonium bromide, cesium bromide, strontium bromide, lithium bromide, and mixtures thereof.

10. The electrolytic cell of claim 7, wherein the electrolyte is the same in both chambers and is sulfuric or phosphoric acid.

11. The electrolytic cell of claim 1 wherein the source of the bromide ions are dissolved compounds selected from the group consisting of tetrapropyl ammonium bromide, potassium bromide, sodium bromide, and mixtures thereof.

* * * * *